US008149358B2

(12) United States Patent
Takatani et al.

(10) Patent No.: US 8,149,358 B2
(45) Date of Patent: Apr. 3, 2012

(54) AUTOMATED TELLER MACHINE

(75) Inventors: Tomoo Takatani, Nara (JP); Akira Imai, Nara (JP); Hiroshi Fukushima, Yamatokorlyama (JP); Koji Yabuta, Kashiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 408 days.

(21) Appl. No.: 12/446,663

(22) PCT Filed: Oct. 12, 2007

(86) PCT No.: PCT/JP2007/070001
§ 371 (c)(1),
(2), (4) Date: Apr. 22, 2009

(87) PCT Pub. No.: WO2008/059683
PCT Pub. Date: May 22, 2008

(65) Prior Publication Data
US 2010/0091226 A1  Apr. 15, 2010

(30) Foreign Application Priority Data
Nov. 13, 2006 (JP) .................................. 2006-307123

(51) Int. Cl.
*G02F 1/1333* (2006.01)
(52) U.S. Cl. ........................................................ 349/110
(58) Field of Classification Search .................... None
See application file for complete search history.

(56) References Cited

U.S. PATENT DOCUMENTS

| 5,663,831 | A * | 9/1997 | Mashitani et al. | ............ 359/463 |
| 7,583,327 | B2 * | 9/2009 | Takatani | ......................... 349/15 |
| 7,813,042 | B2 * | 10/2010 | Mather et al. | ................. 359/619 |
| 2005/0073577 | A1 * | 4/2005 | Sudo et al. | ....................... 348/51 |
| 2005/0200781 | A1 | 9/2005 | Takatani | |
| 2007/0058127 | A1 * | 3/2007 | Mather et al. | ................. 349/159 |
| 2009/0015763 | A1 * | 1/2009 | Woo et al. | ...................... 349/106 |
| 2009/0109126 | A1 * | 4/2009 | Stevenson et al. | ................ 345/4 |
| 2009/0190074 | A1 * | 7/2009 | Woo et al. | ...................... 349/106 |
| 2010/0014313 | A1 * | 1/2010 | Tillin et al. | .................... 362/606 |
| 2010/0073466 | A1 * | 3/2010 | Jones et al. | ..................... 348/51 |

FOREIGN PATENT DOCUMENTS
JP  2001-167324  6/2001

OTHER PUBLICATIONS

International Search Report for PCT/JP2007/070001, mailed Jan. 22, 2008.

* cited by examiner

*Primary Examiner* — Sung Pak
(74) *Attorney, Agent, or Firm* — Nixon & Vanderhye P.C.

(57) ABSTRACT

An ATM of the present invention includes a liquid crystal display panel having, between two transparent substrates, (i) an image forming layer including at least a liquid crystal layer and a pixel section in which RGB pixels are arranged in a matrix manner, and (ii) a plurality of barriers (16) for splitting a display image formed by the image forming layer into a plurality of images each having a specific viewing angle. The plurality of barriers are provided so as to face the image forming layer. The plurality of barriers (16) are extended in a horizontal direction (lateral direction) parallel to the surfaces of the transparent substrates, and provided at substantially regular intervals in a direction perpendicular to the horizontal direction, parallel to the surfaces of the transparent substrates (i.e., in a longitudinal direction). This makes it possible to provide an ATM that prevents a peep at private information such as a secret number without giving, whichever direction a display is viewed, a false recognition that the display is in a resting state.

6 Claims, 8 Drawing Sheets

AUTOMATED TELLER MACHINE

This application is the U.S. national phase of International Application No. PCT/JP2007/070001 filed 12 Oct. 2007 which designated the U.S. and claims priority to Japan Application No. 2006-307123 filed 13 Nov. 2006, the entire contents of each of which are hereby incorporated by reference.

TECHNICAL FIELD

The present invention relates to an automated teller machine having a liquid crystal display panel, and particularly to an automated teller machine installed in a bank, a convenience store, or the like.

BACKGROUND ART

ATMs (automated teller machines) have been installed in banks and convenience stores. Such ATMs are used such that a user inserts a cash card etc. into an ATM, and enters private information such as a secret number. A problem that another person can peep at the private information such as a secret number arises when the user enters the private information.

In addressing the problem, there is an art in which one or two louver films, which are marketed by 3M, is or are stacked on a liquid crystal display panel so that outgoing light traveling rightward and leftward is intercepted. This prevents a peep from the right or from the left.

SUMMARY OF INVENTION

Unfortunately, the conventional art employing the louver film for preventing a peep gives rise to a problem as below.

That is, it seems to a user that an ATM is in a resting state when the ATM is viewed from the right or from the left, in a case where such a louver film is provided. This is because the light traveling rightward and leftward is intercepted. This leads to a problem of giving the user a false recognition that the ATM is in a resting state.

Another problem is that the provision of louver film(s) would not be able to prevent a peep from above or from below. Thus, it is not possible to prevent a peep at private information via a CCD camera etc. provided to an upper part of the ATM. It is conceivable that an additional louver film is provided so that an image is displayed (i.e., light is emitted) only toward a user. However, in this case, the user can recognize the image only while the user is in a specific area. Accordingly, in a case where the user views a display of the ATM while he is away from such a specific area, it appears to the user that a display of the ATM is turned off. As is the case with the above, this leads to a problem of giving the user a false recognition that the ATM is in a resting state.

Methods for improving security which utilize one-time password, vein recognition, or the like are not easy to understand especially for the elderly. This leads to a problem of impairing convenience.

The present invention was made in view of the problems. An object of the present invention is to provide an automated teller machine that prevents a peep at private information such as a secret number without giving, whichever direction a display is viewed, a false recognition that the display is in a resting state.

In order to attain the object, an automated teller machine of the present invention is an ATM comprising a liquid crystal display panel, the liquid crystal display panel including: an image forming layer including at least a liquid crystal layer and a pixel section in which pixels are arranged in a matrix manner; and a plurality of parallax barrier layers, provided so as to face the image forming layer, for splitting a display image formed by the image forming layer into a plurality of images each having a specific viewing angle, the image forming layer and the plurality of parallax barrier layers being provided between two transparent substrates, the plurality of parallax barrier layers being (i) provided so as to extend in a horizontal direction parallel to surfaces of the two transparent substrates, and (ii) provided at substantially regular intervals in a direction that is perpendicular to the horizontal direction and is parallel to the surfaces of the two transparent substrates.

The horizontal direction refers to a left-right direction (lateral direction) as viewed from a user facing the liquid crystal display panel during normal use of the ATM. The ATM of the present invention is, for example, that ATM of a type to require a user to enter a secret number, which is installed in a bank, a convenience store, or the like.

According to the arrangement, the parallax barrier layers are extended in the horizontal direction parallel to layers of the transparent substrates, and provided at substantially regular intervals in the direction parallel to the surfaces of the transparent substrates, which direction is perpendicular to the horizontal direction. This makes it possible to display different images upward and a downward, respectively (e.g., an image A is displayed upward and an image B is displayed downward), or to display different images in the upward direction, the downward direction, and a direction between the upward direction and the downward direction, respectively (e.g., the image A is displayed in the upward direction and the downward direction and the image B is displayed in the direction between the upward direction and the downward direction). That is, it is possible to split an image in longitudinal directions.

Even if a CCD camera for secretly taking an image of a secret number is provided to an upper part of the ATM, this makes it possible to display in a direction toward the CCD camera an image irrelevant to private information, which is supposed to be displayed toward a user, such as a secret number, and, on the other hand, display the private information toward the user.

Moreover, the present invention makes it possible to display an image in any of the longitudinal directions. This makes it possible to present any images to a person who is away from the ATM. This eliminates a possibility of giving the person who is away from the ATM a false recognition that the ATM is in the resting state.

The automated teller machine of the present invention is preferably arranged such that the plurality of parallax barrier layers are provided so that a center line extending between respective adjacent two of the plurality of parallax barrier layers deviates from a center line extending between respective two pixels adjacent in the direction perpendicular to the horizontal direction.

According to the arrangement, a center line between adjacent parallax barrier layers is positioned with a displacement from a center line between pixels adjacent in the direction perpendicular to the horizontal direction. This makes it possible to display a specific image upward and downward, and, on the other hand, display another image in a direction between the upward direction and the downward direction. Further, the direction in which the another image is displayed can be changed in accordance with a direction in which the parallax barrier is displaced.

This makes it possible to display a private image in accordance with a height of a user, and, on the other hand, another information can be sent in other directions.

In order to attain the object, the automated teller machine of the present invention is an ATM comprising a liquid crystal display panel, the liquid crystal display panel including: an image forming layer including at least a liquid crystal layer and a pixel section in which pixels are arranged in a matrix manner; and a plurality of parallax barrier layers, provided so as to face the image forming layer, for splitting a display image formed by the image forming layer into a plurality of images each having a specific viewing angle, the image forming layer and the plurality of parallax barrier layers being provided between two transparent substrates, the plurality of parallax barrier layers being (i) provided so as to extend parallel to surfaces of the two transparent substrates and in a direction perpendicular to a horizontal direction parallel to the surfaces of the two transparent substrates and (ii) provided in the horizontal direction at substantially regular intervals, and the plurality of parallax barrier layers being provided so that a center line extending between respective two of the plurality of parallax barrier layers provided at substantially regular intervals is located on pixels.

The horizontal direction refers to a left-right direction (lateral direction) as viewed from a user facing the liquid crystal display panel during normal use of the ATM. The ATM of the present invention is, for example, that ATM of a type to require a user to enter a secret number, which is installed in a bank, a convenience store, or the like.

According to the arrangement, the parallax barrier layers are provided in such a manner that a center line of a space between parallax barriers is positioned on pixels. This allows not only displaying, as in the case with conventional dual view, different images rightward and leftward, respectively, but also displaying another image in a direction between the rightward direction and the leftward direction.

Further, the present invention makes it possible to display an image in any of the lateral directions. This makes it possible to present an image to a person who is away from the ATM. This makes it possible to prevent the ATM from giving the person who is away from the ATM a false recognition that the ATM is in the resting state.

The automated teller machine of the present invention is preferably arranged such that the pixels on which the center line extending between respective two of the plurality of parallax barrier layers is located are pixels provided in every other column in the horizontal direction.

The automated teller machine of the present invention is preferably arranged such that the plurality of parallax barrier layers are provided so that (i) a center line extending between respective adjacent two of the plurality of parallax barrier layers and (ii) a center line extending between respective two pixels adjacent in the direction perpendicular to the horizontal direction overlap each other.

According to the arrangement, the parallax barrier layers are provided so that a center line between adjacent parallax barrier layers is positioned on a center line of pixels. Therefore, an image formed by the pixels on which the center line between the parallax barrier layers is positioned is displayed in a frontward direction (i.e., in a direction perpendicular to the liquid crystal display panel). Images formed by the other pixels can form images to be displayed respectively rightward and leftward.

This allows an ATM, which is usually operated by an operator standing in front of the ATM, to display an image toward the operator, and, on the other hand, display another image toward the right and left of the operator. As such, displaying a private image toward the operator and, meanwhile, displaying, toward the right and left of the operator, an image such as an image of an advertisement, which image is irrelevant to privacy, make it possible to protect privacy and send information.

The automated teller machine of the present invention is preferably arranged such that the plurality of parallax barrier layers are provided so that a center line extending between respective adjacent two of the plurality of parallax barrier layers deviates from a center line extending between respective two pixels adjacent in the direction perpendicular to the horizontal direction.

This makes it possible to display, in a desired direction between the rightward direction and the leftward direction, an image different from an image to be displayed rightward and leftward, in accordance with an amount of displacement of the parallax barrier layers.

Additional objects, features, and strengths of the present invention will be made clear by the description below. Further, the advantages of the present invention will be evident from the following explanation in reference to the drawings.

EXPLANATION OF REFERENCE LETTERS AND NUMERALS

12 First glass substrate (transparent substrate)
16 Parallax barrier (parallax barrier layer)
17 Second glass substrate (transparent substrate)
R Pixel
G Pixel
B Pixel

DESCRIPTION OF EMBODIMENTS

[First Embodiment]

An ATM (automated teller machine) of the present embodiment is an ATM of a type to be installed chiefly in banks or the like (hereinafter, an ATM of the type is referred to as "bank ATM," for convenience of explanation).

Figure 2:
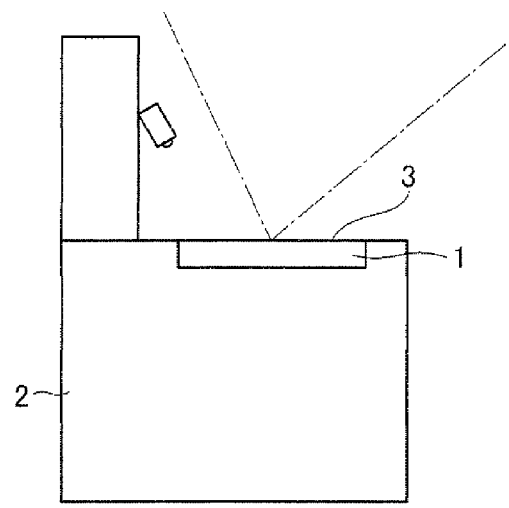
FIG. 2 is a schematic view illustrating a bank ATM.

FIG. 2 is a schematic view illustrating a bank ATM. The bank ATM is composed of a liquid crystal display apparatus 1, and a housing 2 whose side has an L-shape and which includes the liquid crystal display apparatus 1. A user of the bank ATM stands so as to face the liquid crystal display apparatus 1, and performs an operation such as a deposit withdrawal. As illustrated in FIG. 2, most of bank ATMs are provided so that their display screens 3 are substantially parallel to their installation surfaces 4 (ground), respectively.

Figure 3:
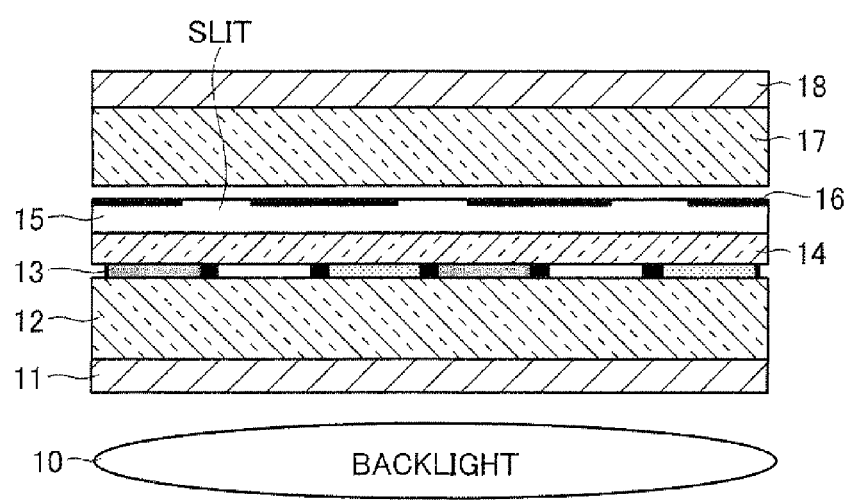
FIG. 3 is a cross-sectional view illustrating a schematic arrangement of a liquid crystal display apparatus provided in the bank ATM illustrated in FIG. 2.

FIG. 3 is a cross-sectional view illustrating a schematic arrangement of a liquid crystal display panel to be provided in the liquid crystal display apparatus. As illustrated in FIG. 3, a backlight 10 is provided so as to face the liquid crystal display panel.

As illustrated in FIG. 3, the liquid crystal display panel includes a first polarizing plate 11, a first glass substrate (transparent substrate) 12, a color filter 13 having colors in which RGB are arranged in this order repeatedly, a thin glass 14, an adhesive layer 15, parallax barriers (also referred to as parallax barrier layer; hereinafter, simply referred to as "barrier") 16, a second glass substrate (transparent substrate) 17, and a second polarizing plate 18, in this order from the side of the backlight 10.

A barrier 16, which is used in a conventional dual view liquid crystal technology, is used to cause light passed through the color filter 13 to be split so that different images are displayed in different directions.

Figure 1:
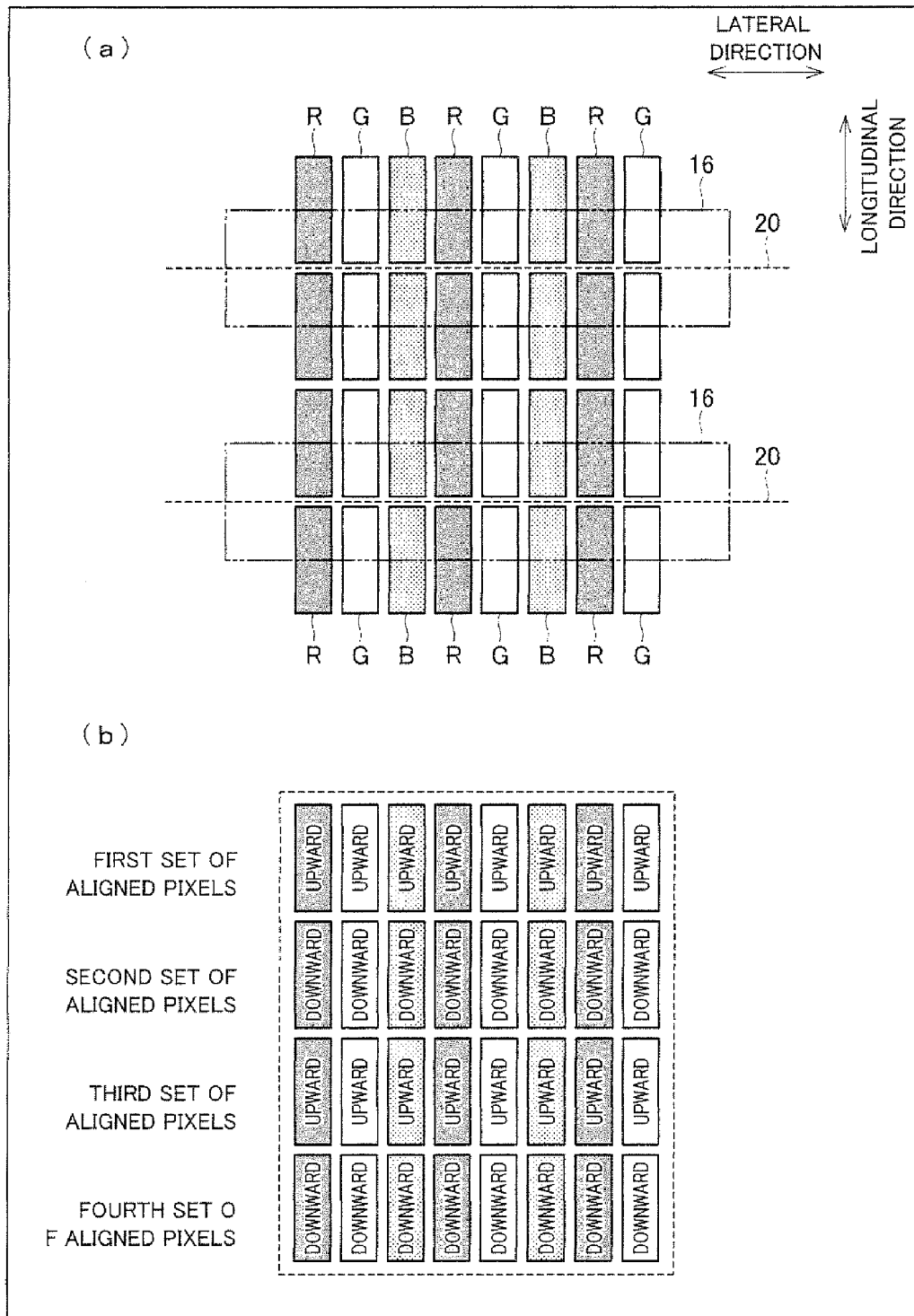
FIG. 1 (a) of FIG. 1 is a schematic plan view illustrating a liquid crystal display panel of a first embodiment of the present invention. (b) of FIG. 1 is also a schematic plan view illustrating the liquid crystal display panel illustrated in (a) of FIG. 1, from which liquid crystal display panel barriers are removed.

(a) of FIG. 1 is a schematic plan view of the liquid crystal display panel. As illustrated in FIG. 1, the liquid crystal display panel chiefly includes (i) a pixel section, in which R (red) pixels, G (green) pixels, and B (blue) pixels are arranged in a matrix manner, and (ii) barriers 16. The pixels are arranged in a lateral direction (horizontal direction) in order of R, G, B, R, G, B, R, . . . . In the pixel section, concolorous pixels are arranged in a longitudinal direction (vertical direction). The pixel section and a liquid crystal layer, which is not illustrated, form an image forming layer. The barriers 16 are provided so as to face the image forming layer.

In order to clearly illustrate an arrangement of a characterizing portion of the present embodiment, (a) of FIG. 1 illustrates an arrangement in which the liquid crystal display panel is provided with only the pixel section and the barriers 16. An upward direction, a downward direction, a rightward direction, and a leftward direction in the schematic plan view of (a) of FIG. 1 correspond to an upward viewing direction, a downward viewing direction, a rightward viewing direction, and a leftward viewing direction, respectively, in which a user views while using a bank ATM.

As illustrated in (a) of FIG. 1, the barriers 16 are extended in the lateral direction. In other words, the lateral direction is a direction in which a longer side of a barrier 16 is oriented. The barriers 16 are provided in the longitudinal direction at certain intervals (at substantially regular intervals). More specifically, each of the barriers 16 is extended so that its center line 20 in the lateral direction is positioned on each center line extending between corresponding two pixels in the longitudinal direction, and both ends of each of the barriers 16 in the longitudinal direction are positioned near respective center lines of corresponding two pixels in the longitudinal direction, respectively. That is, each of the barriers 16 is provided so as to evenly cover a substantially half of each of corresponding two pixels in the longitudinal direction.

(b) of FIG. 1 is also a schematic plan view illustrating the liquid crystal display panel, illustrated in (a) of FIG. 1, from which the barriers 16 are removed. As illustrated in (b) of FIG. 1, the provision of the barriers 16 as illustrated in (a) of FIG. 1 makes it possible to display, for each of four sets of aligned pixels in the lateral direction, an image upward or downward. More specifically, a first set of aligned pixels illustrated in (b) of FIG. 1 can display an upward image (i.e., an image displayed upward); a second set of aligned pixels can display a downward image (i.e., an image displayed downward); a third set of aligned pixels can display an upward image; and a forth set of aligned pixels can display a downward image.

Figure 4:
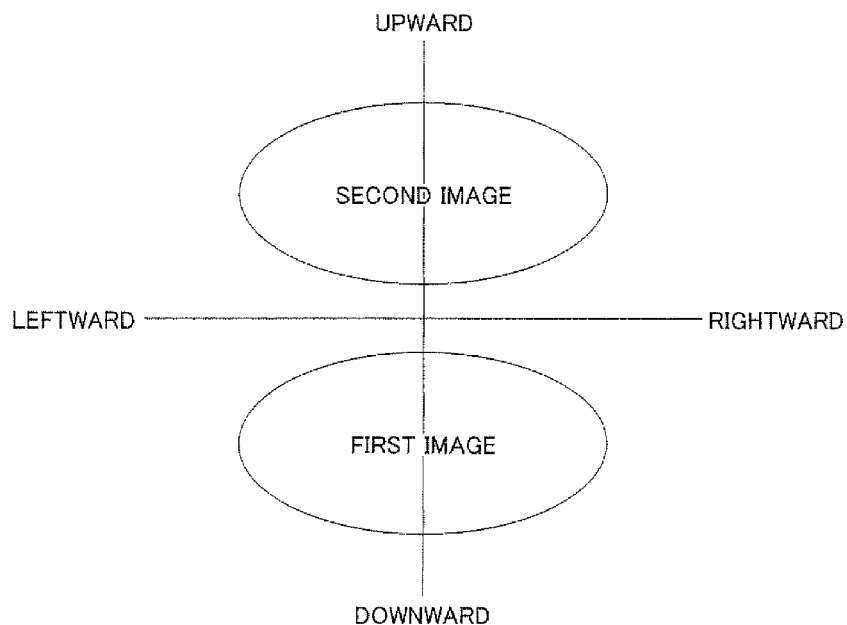
FIG. 4 is a view illustrating a split of an image upward and downward.

As illustrated in FIG. 4, this makes it possible to split an image upward and downward, when the liquid crystal display panel is viewed as a whole. As such, it is possible to display (i) downward private information such as an image for entering a secret number (private image; first image) and (ii) upward (i.e., in a direction in which a spy camera etc. can be installed) an image such as an image of an advertisement of a bank (advertisement image; second image).

Figure 5:
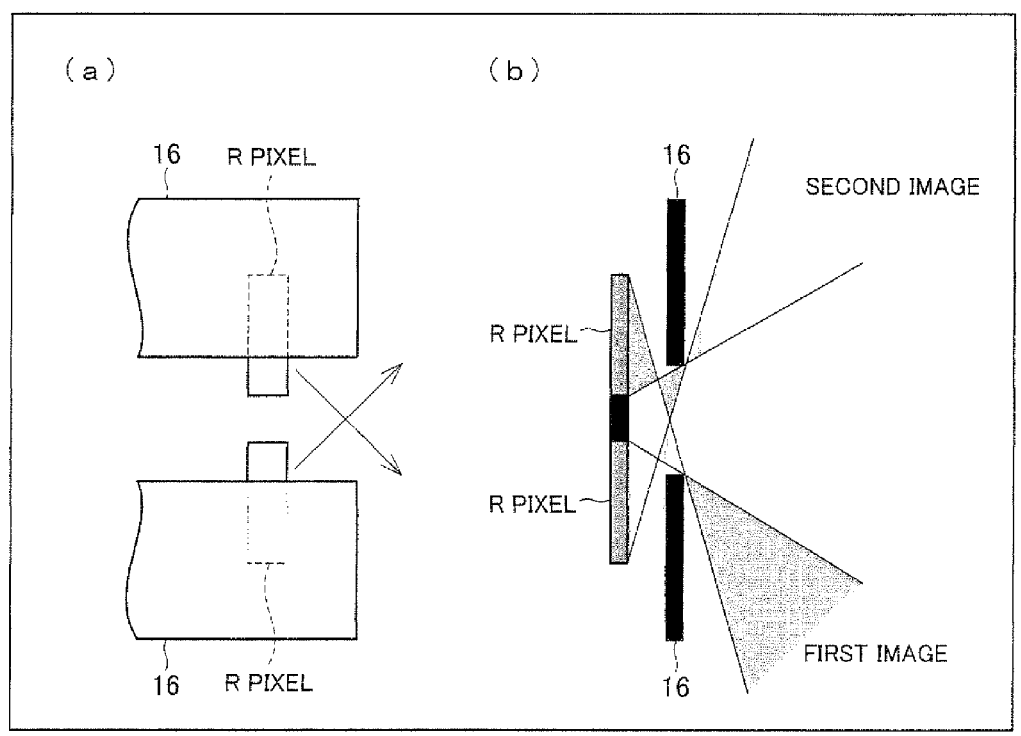
FIG. 5 (a) of FIG. 5 is a schematic plan view illustrating, among pixels and barriers illustrated in (a) of FIG. 1, corresponding two R pixels in a longitudinal direction, and barriers respectively covering the two R pixels. (b) of FIG. 5 is a view for explaining a principle by which an image is split upward and downward by an arrangement illustrated in (a) of FIG. 5.

Each of (a) and (b) of FIG. 5 is an explanatory view for showing in detail a principle causing an image to be split upward and downward. Specifically, (a) of FIG. 5 is a schematic plan view illustrating, among the pixels and barriers illustrated in (a) of FIG. 1, corresponding two R pixels in the longitudinal direction, and the barriers 16 covering the corresponding two R pixels, respectively. (b) of FIG. 5 is an explanatory view for showing a principle causing an image to be split upward and downward by an arrangement illustrated in (a) of FIG. 5.

As illustrated in (b) of FIG. 5, a lower one of the corresponding two R pixels serves to form a second image upward. On the other hand, an upper one serves to form a first image downward.

Accordingly, even in a case where a spy camera etc. is installed, as illustrated in FIG. 2, above the liquid crystal display apparatus by a criminal, it is possible to prevent the criminal from taking a picture of private information by use of the spy camera, by displaying an advertisement image as a second image to be displayed toward the spy camera (i.e., upward), and by displaying a first image (private image) toward a user (i.e., downward).

According to the present embodiment, an image of some kind can be displayed in any of the longitudinal direction. This makes it possible to prevent a problem of giving a user a false recognition that the ATM is in a resting state, which false recognition is caused because it appears to the user that the display is turned off in a case where three conventional louver films marketed by 3M are provided and the display is viewed by the user from a distant position.

The present embodiment discloses an art for preventing a peep from above. This is because it is unlikely that a peep from the right or from the left occurs since partitions etc. for preventing a peep are usually provided on both sides of a bank ATM. Therefore, an ATM according to the present embodiment is not limited to an ATM to be installed in a bank, but can be used as any ATM that requires prevention of a peep in a longitudinal direction, rather than a peep in a lateral direction.

Figure 6:
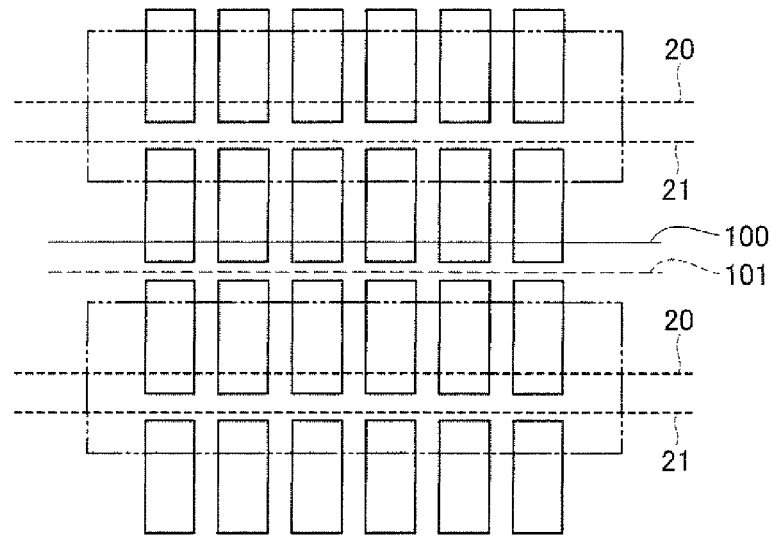
FIG. 6 is a schematic plan view illustrating the liquid crystal display panel illustrated in (a) of FIG. 1, on which liquid crystal display panel the barriers have been displaced from positions illustrated in (a) of FIG. 1.

The present embodiment is not limited to an arrangement in which the barriers 16 are transversely provided. In the description above, each of the barriers 16 is extended so that a center line 20 of each barrier 16 extended in the lateral direction is positioned on each center line extending between corresponding two pixels in the longitudinal direction, and both ends of each of the barriers 16 in the longitudinal direction are positioned near respective center lines of corresponding two pixels in the longitudinal direction, respectively. The present embodiment is not limited to this. As illustrated in FIG. 6, the barriers 16 can be provided more upward in the longitudinal direction than those illustrated in (a) of FIG. 1.

Specifically, the barriers 16 can be provided, as illustrated in FIG. 6, so that the center line 20 of each of the barriers 16 extended in the lateral direction is displaced from a center line 21 extending between corresponding pixels in the longitudinal direction, and so that a center line 100 extending between the barriers 16 is displaced from a center line 101 extending between corresponding pixels in the longitudinal direction.

The displacing of the barriers 16 allows a change in direction in which the private image (first image) is displayed, and a change in direction in which the advertisement image (second image) is displayed.

Figure 7:
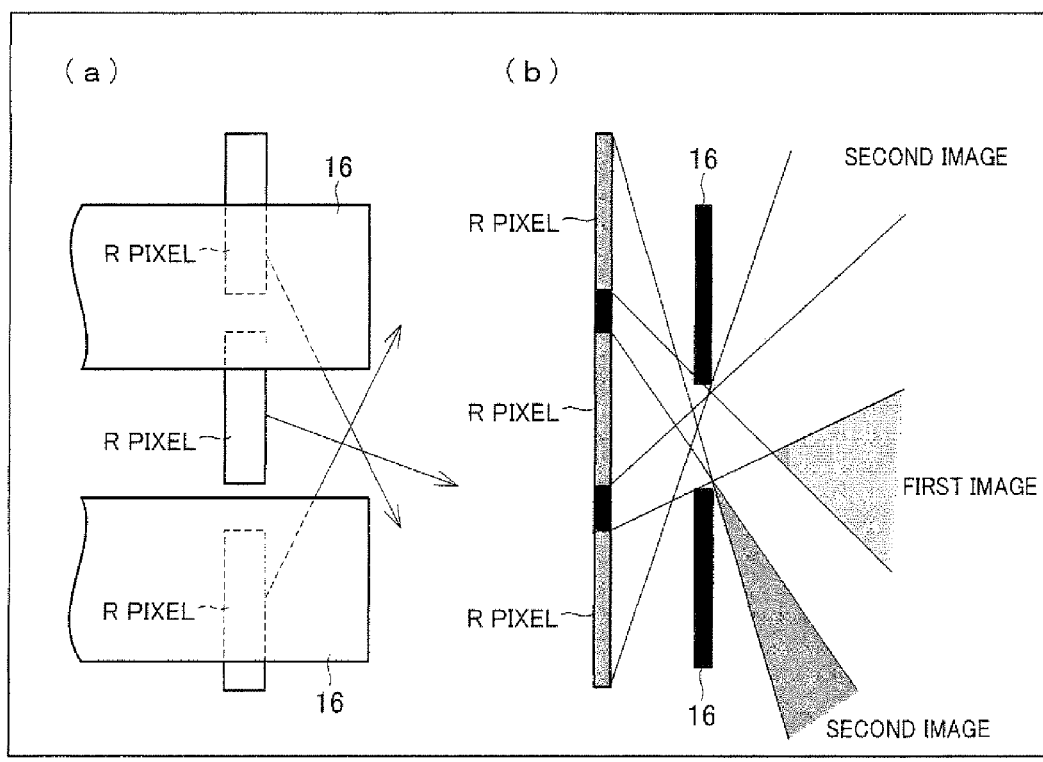
FIG. 7 (a) of FIG. 7 is a schematic plan view illustrating, among the pixels and the barriers illustrated in (a) of FIG. 1, (i) three corresponding R pixels in the longitudinal direction, (ii) one barrier covering, among the three R pixels, two corresponding R pixels, and (iii) another barrier covering a rest R pixel. (b) of FIG. 7 is a view for explaining a principle by which an image is split by the arrangement illustrated in (a) of FIG. 7.

Furthermore, it is possible to freely set the directions, in which the private image (first image) and the advertisement image (second image) are displayed, respectively, in accordance with an amount of displacement of the barriers 16. (a) and (b) of FIG. 7 are views corresponding to (a) and (b) of FIG. 5, respectively, which views illustrate a case where the barriers 16 are displaced from the positions above. (a) of FIG. 7 is a schematic plan view illustrating, among the pixels and the barriers illustrated in (a) of FIG. 1, (i) corresponding three R pixels in the longitudinal direction, (ii) one barrier 16 covering, out of the three R pixels, its corresponding two R pixels, and (iii) the other barrier 16 covering its corresponding one R pixel. (b) of FIG. 7 is an explanatory view showing a principle causing an image to be split by the arrangement illustrated in (a) of FIG. 7.

As illustrated in (b) of FIG. 7, a topmost R pixel causes a second image to be formed downward, a bottommost R pixel causes the second image to be formed upward, and a middlemost R pixel causes a first image to be formed between the second image displayed downward and the second image displayed upward. That is, in a case where the barriers 16 are displaced as illustrated in (a) and (b) of FIG. 7, (i) it is possible to shift upward area in which the private image (first image) and the advertisement image (second image) are displayed, respectively, and (ii) it is possible to further display the second image below the first image.

In a case where the barriers 16 are thus displaced, it is possible to further display a private image (first image) in the direction in which a composite image made up of the private image (first image) and an advertisement image (second image) has been conventionally displayed. This makes it possible to display a private image (first image) in a desired direction, in accordance with a height of a user and a height of the liquid crystal display apparatus.

According to the description, the barriers 16 are displaced upward in the longitudinal direction. The present embodiment, however, is not limited to this. It is possible to obtain the same effect, even in a case where the barriers 16 are displaced downward in the longitudinal direction, by adjusting an amount of displacement, and by interchanging a first image and a second image.

[Second Embodiment]

An ATM of the present embodiment is an ATM of a type to be installed chiefly in convenience stores (hereinafter, an ATM of the type is referred to as "CVS ATM," for convenience of explanation).

Figure 8:
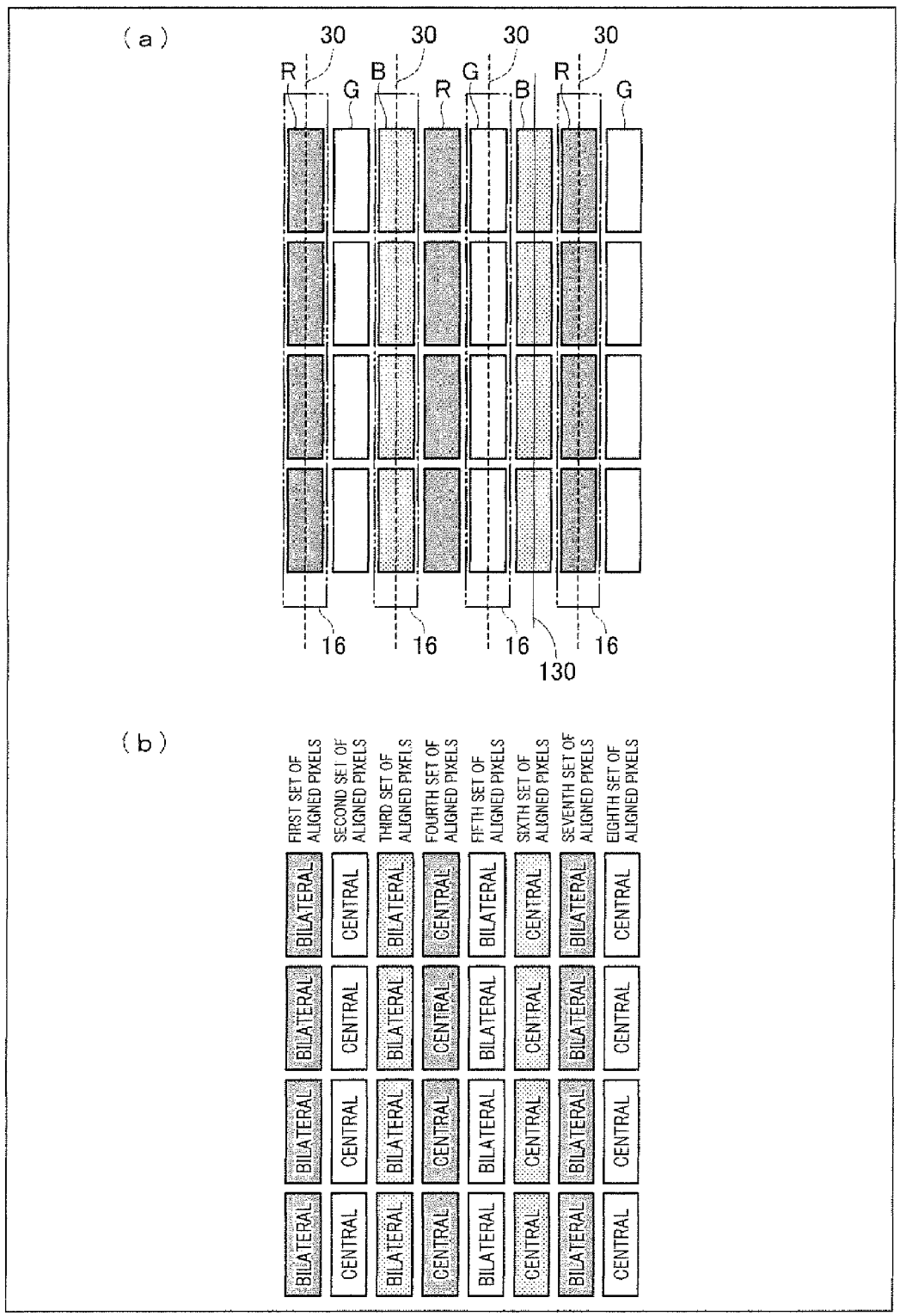
FIG. 8 Each of (a) and (b) of FIG. 8 is a schematic plan view illustrating a liquid crystal display panel of a liquid crystal display apparatus to be provided in an ATM for convenience stores.

(a) of FIG. 8 is a schematic plan view illustrating a liquid crystal display panel of a liquid crystal display apparatus to be provided in a CVS ATM. In a CVS ATM of the present embodiment, barriers 16 are provided so as to extend not in a lateral direction but in a longitudinal direction, unlike the first embodiment. That is, the longitudinal direction is a direction in which longer sides of the barriers 16 are oriented. The barriers 16 are provided in the lateral direction at certain intervals. In (a) of FIG. 8, the barriers 16 are provided at certain intervals (at intervals of a distance corresponding to two pixels). A description of a stacked structure of the liquid crystal display panel of the present embodiment is omitted since the stacked structure is the same as that of FIG. 3 of the first embodiment.

In the present embodiment, a center line 130 extending between two barriers 16 (i.e., a center line of a transmitting area between barriers 16) extends so as to be located on a pixel between the two barriers 16 and so that (i) a center line 30 of pixels in the lateral direction and (ii) the center line 130 overlap each other. As illustrated in (a) of FIG. 8, more specifically, sets of aligned pixels in the longitudinal direction are alternately covered with barriers 16. That is, in (a) of FIG. 8, for example, a leftmost set of aligned R pixels is covered with a barrier 16. The second set of aligned G pixels from the left is not covered with a barrier 16. The third set of aligned B pixels from the left is covered with a barrier 16. Similarly, the fourth set of aligned R pixels which is not covered with a barrier 16, the fifth set of aligned G pixels which is covered with a barrier 16, . . . are subsequently provided. Note that the present embodiment is not limited to the case where sets of aligned pixels in the longitudinal direction are alternately covered a barrier 16. The present embodiment includes a case where a set of aligned pixels in the longitudinal direction covered with a barrier 16 occur every three sets of aligned pixels, and a case where a set of aligned pixels in the longitudinal direction covered with a barrier 16 occur every four sets of aligned pixels.

(b) of FIG. 8 is also a schematic plan view illustrating the liquid crystal display panel illustrated in (a) of FIG. 8, from which the barriers 16 are removed. As illustrated in (b) of FIG. 8, the provision of the barriers 16 as illustrated in (a) of FIG. 8 makes it possible to alternately split, for each of sets of aligned pixels which sets are corresponding to each other in the lateral direction, an image to be displayed, into a frontward (central) image, or a rightward image and a leftward image.

More specifically, a first set of aligned pixels (a set of aligned R pixels) illustrated in (b) of FIG. 8 is covered with a barrier 16. Therefore, the first set of aligned pixels can be used to display a bilateral image (i.e., an image displayed leftward and leftward). A second set of aligned pixels (a set of aligned G pixels) is not covered with a barrier 16. Therefore, the second set of aligned pixels can be used to display a frontward image. Similarly, respective of third, fifth, and a seventh set of aligned pixels can be used to display a bilateral image, while respective of fourth, sixth, and eighth set of aligned pixels can be used to display a frontward image.

Figure 9:
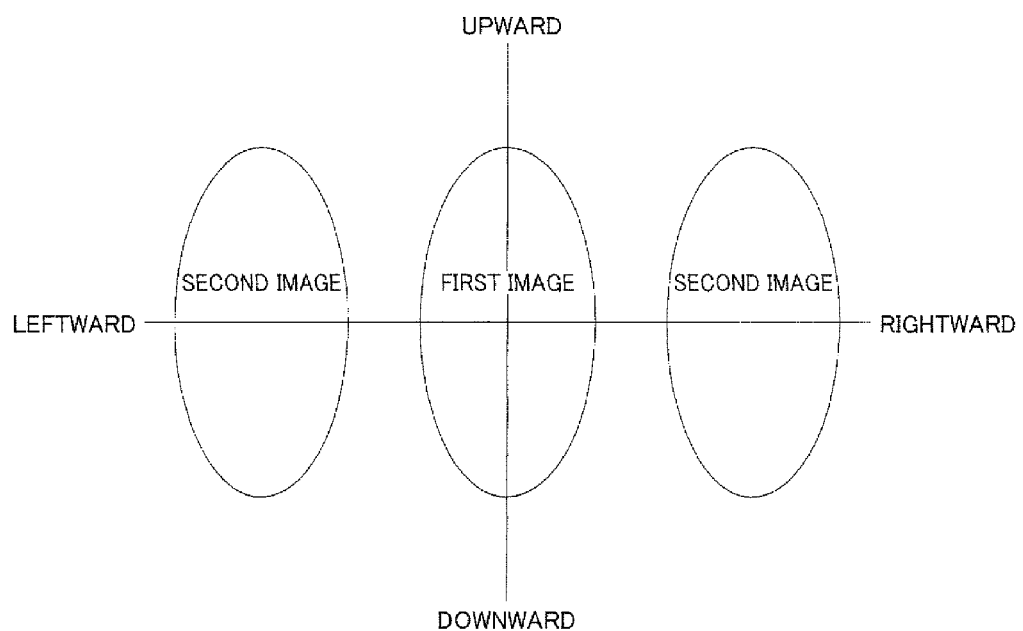
FIG. 9 is a view illustrating that an image can be split frontward, rightward, and leftward.

With the arrangement, it is possible to split an image frontward, rightward and leftward (see FIG. 9). As such, it is possible to display, toward a user, i.e., frontward, private information (private image; first image) such as an image for entering a secret number, whereas display another image (advertisement image; second image) such as an image of an advertisement of a bank rightward and leftward. This is because a person waiting behind the user is likely to peep at an image displayed rightward and leftward.

Figure 10:
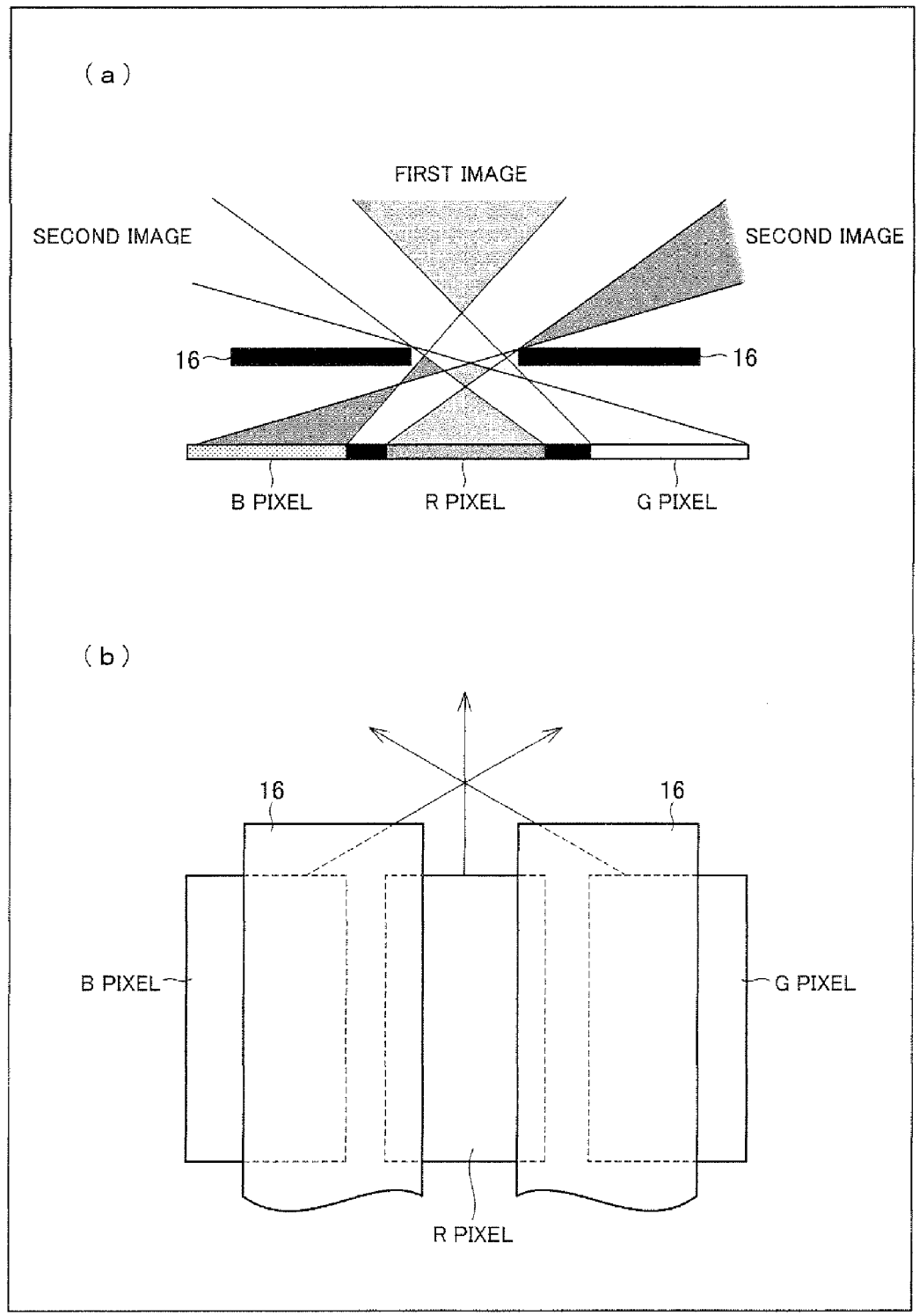
FIG. 10 Each of (a) and (b) of FIG. 10 is a view for explaining in detail a principle by which an image is split frontward, rightward, and leftward. (a) of FIG. 10 is a view for explaining a principle by which an image is split by an arrangement illustrated in (b) of FIG. 10. (b) of FIG. 10 is a schematic plan view illustrating, among pixels and barriers illustrated in (a) of FIG. 8, three pixels: an R pixel; a G pixel; and a B pixel, which correspond to each other in a lateral direction, and barriers 16 covering the G pixel and the B pixel.

(a) and (b) of FIG. 10 are explanatory views for showing in detail a principle causing an image to be split frontward, rightward, and leftward. FIG. 10 illustrates (i) corresponding B, R, and G pixels in the lateral direction and (ii) an image to be displayed by use of barriers 16 covering the B and G pixels. The B and G pixels, which are covered with the barriers 16, serve to form a rightward image and a leftward image, respectively, which are identical to each other. The R pixel, which is not covered with a barrier 16, serves to form a frontward image.

This causes a person waiting behind a user of the CVS ATM or a person walking by the user to view an image which is different from an image viewed by the user of the CVS ATM. On this account, it is possible to prevent a peep at private information.

According to the present embodiment, an image of some kind can be displayed upward and downward. This makes it possible to prevent a problem of giving a user a false recognition that the ATM is in a resting state, which false recognition is caused because it appears to the user that a display is not turned on in a case where three conventional louver films marketed by 3M are provided and the display is viewed by the user from a distant position.

The present embodiment discloses an art for preventing a peep from the right or from the left. This is because it is unlikely that a peep occurs from above since a display screen of a CVS ATM is provided so as to stand upright, unlike a bank ATM. Therefore, the ATM of the present embodiment is not limited to the one used in a convenience store but is applicable to any ATM that requires positive prevention of a peep in a lateral direction, rather than a longitudinal direction.

According to the arrangement, a first image can be displayed rightward and leftward by, among corresponding sets of aligned pixels in the lateral direction, the first set of aligned pixels covered by a barrier 16, while a second image can be displayed frontward (central direction) by the second set of aligned pixels which are not covered with a barrier 16.

As such, displaying, as a second image and a first image, private information and an image showing information except the private information, respectively, make it possible to prevent from the second image being peeped from the right or left by a person waiting behind a user of a CVS ATM or a person walking by the CVS ATM.

According to the arrangement, further, an image such as an image of an advertisement of a bank is displayed as a first image. This makes it possible to send information to a person waiting behind a user of the CVS ATM or a person walking by the CVS ATM.

In the present embodiment, a center line 130 between barriers 16 (i.e., a center line of a transmitting area between barriers 16) is extended in the longitudinal direction so as to be positioned on pixels and on a center line 30 of the pixels. However, the present embodiment is not limited to this. Alternatively, a center line 130 extending between barriers 16 (a center line of a transmitting area between barriers) can have a position which is not on a center line 30 of pixels.

An amount of displacement of a barrier 16 varies depending on a pixel size of a liquid crystal display panel to be used as a base. Such an amount can be set to, for example, 25%±10% of a longitudinal width of one pixel.

The present embodiment has dealt with an example in which a backlight is provided. The present invention is not limited to this, but can be an ATM having a frontlight.

In (b) of FIG. 5, (b) of FIG. 7, and (a) of FIG. 10, areas of the color filters which correspond to pixels are referred to as "R pixel," "G pixel," and "B pixel", respectively, for convenience of explanation. The areas are not pixels in the strict sense but color filters.

Reference Example

There has been conventionally known an art called dual view. There has been conventionally no ATM utilizing the dual view. However, the following briefly describes for reference the dual view, with reference to drawings.

Figure 11:
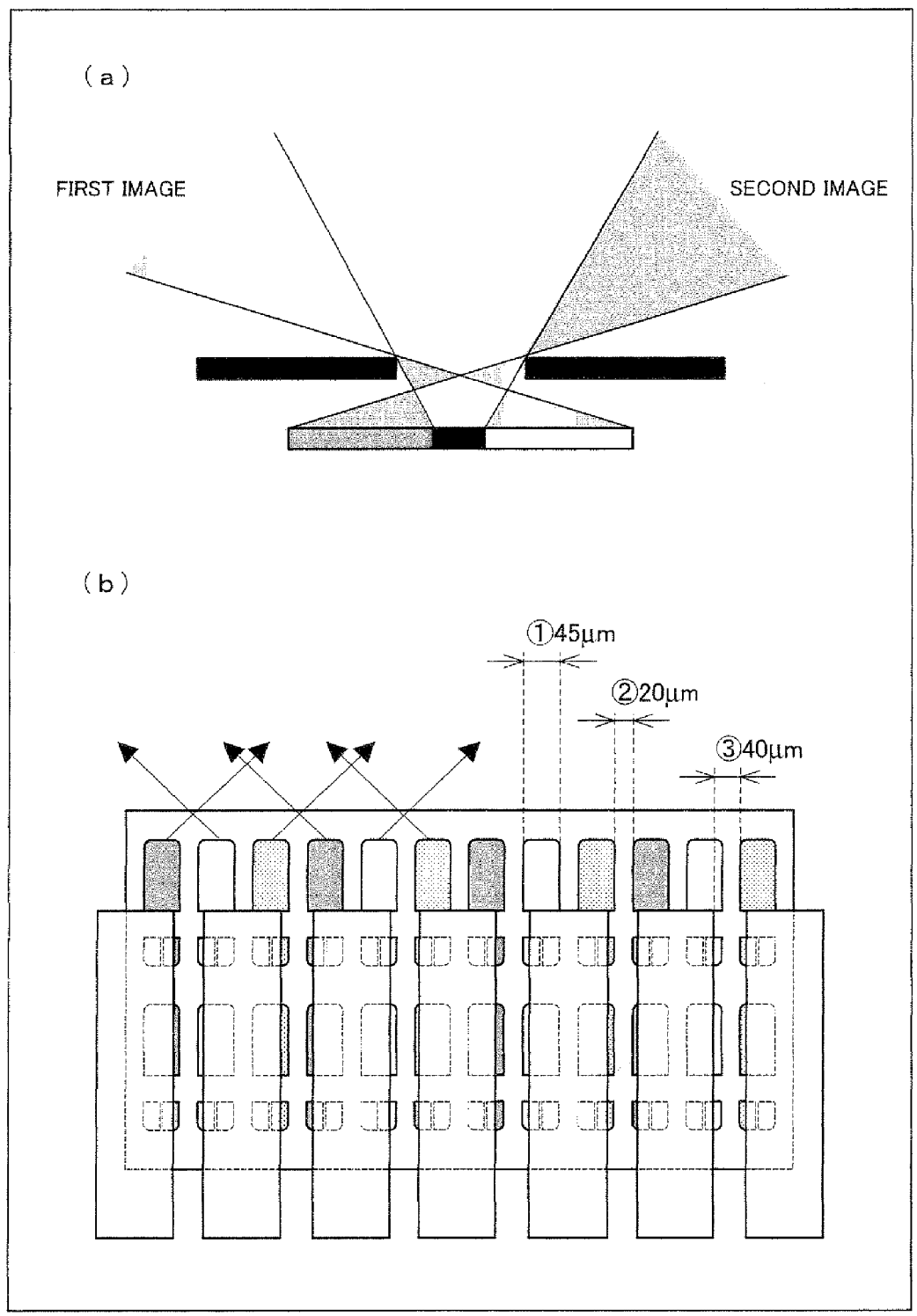
FIG. 11 (a) of FIG. 11 is a view illustrating conventional dual view. (b) of FIG. 11 is also a view illustrating the conventional dual view.

(a) and (b) of FIG. 11 are explanatory views showing a conventional dual view. (a) of FIG. 11 is a schematic cross-sectional view. (b) of FIG. 11 is a schematic plan view.

(b) of FIG. 11 illustrates an arrangement in which parallax barriers are longitudinally provided in a liquid crystal display section in which pixels are arranged in a matrix manner. This makes it possible to display different images (first and second images) rightward and leftward, respectively (see (a) of FIG. 11). A lateral length of a pixel is 45 μm (see a circled number 1 in (b) of FIG. 11). A distance between pixels is 20 μm (see a circled number 2 in (b) of FIG. 11). A distance between parallax barriers is 40 μm (see a circled number 3 in (b) of FIG. 11).

The present invention is not limited to the foregoing first and second embodiments, but can be altered by a skilled person within the scope of the claims. An embodiment based on a proper combination of technical means disclosed in different embodiments also falls within the technical scope of the present invention.

As described above, an automated teller machine of the present invention is an automated teller machine comprising a liquid crystal display panel, the liquid crystal display panel including: an image forming layer including at least a liquid crystal layer and a pixel section in which pixels are arranged in a matrix manner; and a plurality of parallax barrier layers, provided so as to face the image forming layer, for splitting a display image formed by the image forming layer into a plurality of images each having a specific viewing angle, the image forming layer and the plurality of parallax barrier layers being provided between two transparent substrates, the plurality of parallax barrier layers being (i) provided so as to extend in a horizontal direction parallel to surfaces of the two transparent substrates, and (ii) provided at substantially regular intervals in a direction that is perpendicular to the horizontal direction and is parallel to the surfaces of the two transparent substrates.

Further, an automated teller machine of the present invention is an automated teller machine comprising a liquid crystal display panel, the liquid crystal display panel including: an image forming layer including at least a liquid crystal layer and a pixel section in which pixels are arranged in a matrix manner; and a plurality of parallax barrier layers, provided so as to face the image forming layer, for splitting a display image formed by the image forming layer into a plurality of images each having a specific viewing angle, the image forming layer and the plurality of parallax barrier layers being provided between two transparent substrates, the plurality of parallax barrier layers being (i) provided so as to extend parallel to surfaces of the two transparent substrates and in a direction perpendicular to a horizontal direction parallel to the surfaces of the two transparent substrates and (ii) provided in the horizontal direction at substantially regular intervals, and the plurality of parallax barrier layers being provided so that a center line extending between respective two of the plurality of parallax barrier layers provided at substantially regular intervals is located on pixels.

This makes it possible to provide an ATM that prevents a peep at private information such as a secret number without giving, whichever direction a display is viewed, a false recognition that the display is in a resting state.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

Industrial Applicability

The present invention is applicable to an automated teller machine to be installed in a bank, a convenience store, or other facility.

The invention claimed is:

1. An automated teller machine comprising a liquid crystal display panel, the liquid crystal display panel including:
   an image forming layer including at least a liquid crystal layer and a pixel section in which pixels are arranged in a matrix manner; and
   a plurality of parallax barrier layers, provided so as to face the image forming layer, for splitting a display image formed by the image forming layer into a plurality of images each having a specific viewing angle,
   the image forming layer and the plurality of parallax barrier layers being provided between two transparent substrates,
   the plurality of parallax barrier layers being (i) provided so as to extend in a horizontal direction parallel to surfaces of the two transparent substrates, and (ii) provided at substantially regular intervals in a direction that is perpendicular to the horizontal direction and is parallel to the surfaces of the two transparent substrates.

2. The automated teller machine as set forth in claim 1, wherein the plurality of parallax barrier layers are provided so that a center line extending between respective adjacent two of the plurality of parallax barrier layers deviates from a center line extending between respective two pixels adjacent in the direction perpendicular to the horizontal direction.

3. An automated teller machine comprising:
   a liquid crystal display panel,
   the liquid crystal display panel including:
   an image forming layer including at least a liquid crystal layer and a pixel section in which pixels are arranged in a matrix manner; and
   a plurality of parallax barrier layers, provided so as to face the image forming layer, for splitting a display image formed by the image forming layer into a plurality of images each having a specific viewing angle,
   the image forming layer and the plurality of parallax barrier layers being provided between two transparent substrates,
   the plurality of parallax barrier layers being (i) provided so as to extend parallel to surfaces of the two transparent substrates and in a direction perpendicular to a horizontal direction parallel to the surfaces of the two transparent substrates and (ii) provided in the horizontal direction at substantially regular intervals,
   the plurality of parallax barrier layers being provided so that a center line extending between respective two of the plurality of parallax barrier layers provided at substantially regular intervals is located on pixels, and
   wherein the two transparent substrates respectively support first and second polarizers, wherein the two transparent substrates and the parallax barrier layers are between the first and second polarizers, and wherein one of the substrates is between the parallax barrier layers and the polarizer supported by said one substrate, and wherein said one substrate and the parallax barrier layers are on the same side of the liquid crystal layer.

4. The automated teller machine as set forth in claim 3, wherein the pixels on which the center line extending between respective two of the plurality of parallax barrier layers is located are pixels provided in every other column in the horizontal direction.

5. The automated teller machine as set forth in claim 4, wherein the plurality of parallax barrier layers are provided so that (i) a center line extending between respective adjacent two of the plurality of parallax barrier layers and (ii) a center line extending between respective two pixels adjacent in the direction perpendicular to the horizontal direction overlap each other.

6. The automated teller machine as set forth in claim 4, wherein the plurality of parallax barrier layers are provided so that a center line extending between respective adjacent two of the plurality of parallax barrier layers deviates from a center line extending between respective two pixels adjacent in the direction perpendicular to the horizontal direction.

* * * * *